July 9, 1935. W. F. FLESSELLES 2,007,329
GAUGE
Filed March 14, 1934
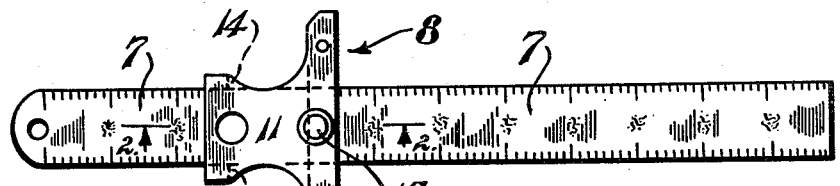
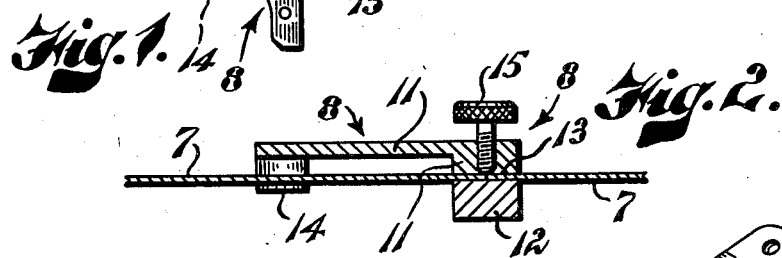
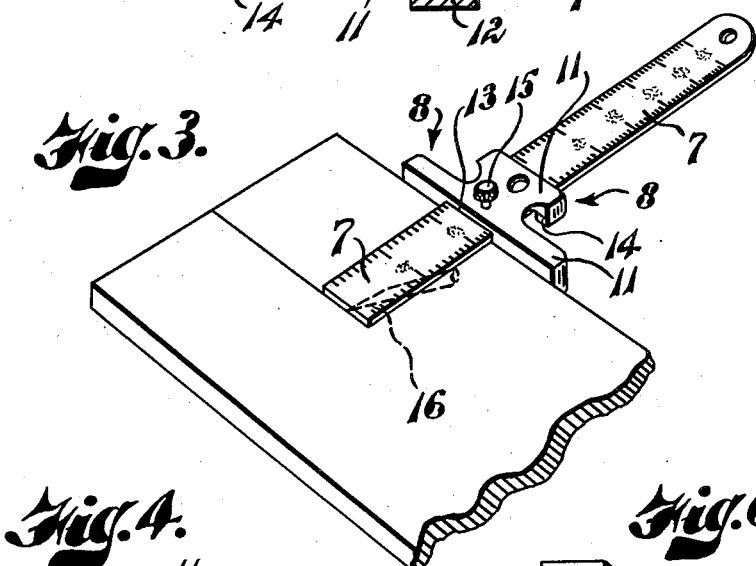
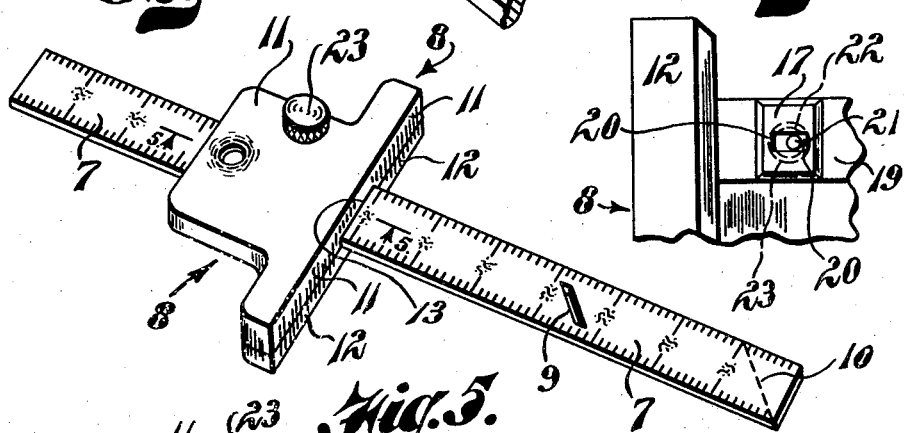

Patented July 9, 1935

2,007,329

UNITED STATES PATENT OFFICE 2,007,329

GAUGE

Warren Frederick Flesselles, Potts Point, near Sydney, New South Wales, Australia Application March 14, 1934, Serial No. 715,543 In Australia April 27, 1933

1 Claim. (Cl. 33—173)

This invention relates to improvements in marking gauges and is also applicable to a depth gauge.

An object of the present invention is to provide an improved gauge of the above nature wherein the head and the sliding member may be temporarily held in fixed relation with each other without the need for clamping screws or the like.

A further object of the invention is to provide improved clamping means for use when it is intended to retain the head and the sliding member in fixed relationship for any length of time and also means whereby the sliding member is retained in contact with one of the edges of the slot in the head wherein it travels, in order that the said sliding member may be retained in its normal position at right angles to the face of the head irrespective of any looseness occasioned by wear.

The invention comprises a head having a relatively broad face and wherein there is a slot through which the sliding member is adapted to pass.

The sliding member may consist of a rod of any desired cross section but is preferably a flexible steel rule.

The head, which is substantially of T shape, is slotted to receive the sliding member, hereinafter referred to as the rule, and has a face normally disposed at right angles to the rule when the latter is placed in the slot in said head.

Behind the head a gripping or holding portion is formed with which the rule does not contact except at the sides thereof where the rule passes between two lugs upstanding from the face of the gripping portion or between faces left after milling out the central portion of the gripping portion.

The head may be provided with a set screw for clamping the rule to the head to facilitate use of the gauge in repetition work; or the rule may be held securely and at the same time forced against one of the edges of the slot by an eccentric or cam disposed in the head so as to contact with a sliding member engaging one of the edges of the rule and force the other edge thereof against the wall of the slot, thus preserving its position at right angles to the face of the head. The eccentric or cam may be operated by a thumb screw or knurled head mounted at the side of the gripping portion.

But in order that the invention may be thoroughly understood and readily carried into practical effect reference is now made to the drawing accompanying and forming part of this complete specification, and wherein:—

Figure 1 is a plan view of a gauge produced in accordance with the invention.

Figure 2 is an enlarged section of the head of the gauge, taken on the line 2—2 of Figure 1.

Figure 3 is a perspective view demonstrating the utility of the gauge illustrated by Figures 1 and 2.

Figure 4 is a perspective view of a modified form of the invention.

Figure 5 is an enlarged section of the modified gauge head taken on the line 5—5 in Figure 4; and Figure 6 is an enlarged plan view showing portion of the under side of the gauge head illustrated in Figures 4 and 5.

The gauge illustrated by Figures 1, 2 and 3, comprises a steel rule 7 and a head 8 wherein the former device is slidable.

The rule bears graduations of any desired denomination.

The head of the gauge in this example of the application of the invention consists of two members 11 and 12 (see Figure 2) which are riveted together, leaving between them a slot 13 wherein the rule 7 is adapted to slide. In some cases the head may be formed in one piece with a slot 13.

The upper member 11 of the head 8 has two lugs 14 on its underface and these engage the edges of the rule 7 and serve to guide the latter and maintain it in true rectangular relationship with the head 8 when the rule is moved in either direction in the slot 13.

The upper member 11 may also have a thumb screw 15 which allows of the rule 7 being held in fixed relation with the head 8.

When the gauge is to be used temporarily as a marking device in the scribing of a line parallel to the edge of a sheet of material, as demonstrated by Figure 3 (wherein 16 represents the point of a scribing appliance) the clamping screw 15 is not required. All that is necessary is to grasp the rule and the rear portion of the head 8 between the thumb and forefinger and exert light pressure.

The consequent flexing of the rule 7 rearwards of the slot 13 with relation to the head of the gauge will hold the rule rigidly in said slot until the pressure is relaxed.

In the modified form of the gauge illustrated by Figures 4, 5 and 6 the means for clamping the rule in the head 8 consist of a block 17 which is inserted in a groove 18 formed in one of side portions 19 depending from the underface of member 11. These side portions 19 form a channel constituting an extension of the slot 13.

The block 17 has a central rectangular aperture 20 which accommodates a pin 21 formed eccentrically on a flange or collar 22 formed on or affixed to the stem of a screw 23.

When the screw 23 is turned the eccentric pin 21 causes the block 17 to be moved in its groove 18 and against the adjacent edge of the rule 7, thereby serving to hold the latter permanently and rigidly in the head 8.

As in the former example the rule 7 and the head 8 may be temporarily held in fixed relationship by exerting pressure so as to flex the rule adjacent to the slot 13.

In this modified form of the gauge the rule 7 has an angularly disposed slot or slots such as 9 formed therein, and in addition or as an alternative to the provision of such slot or slots, the end of the rule 7 may be cut at an angle as indicated in Figure 4 by the broken line 10.

In using the gauge in its modified form, to ascertain the centre of a flat surface with straight sides, the head 8 is placed in engagement with one of such sides (as in Figure 3) and the rule 7 is then moved through it until the angular slot 9 or the angular end 10 of the rule where the latter is provided, is approximately mid-way between the edges of the surface. The rule is then clamped in the head by means of the screw 23 and a line is scribed transversely on the surface to be divided, and along the upper or the lower edge of the rule. A diagonal line is also scribed along the slot 9 or along the angular edge at the end of the rule, according to which device is adopted.

With the rule still clamped in the head of the gauge the instrument is then reversed, the head 8 being placed in engagement with the opposite edge of the surface, with the previously used edge of the rule coinciding with the transverse line.

Upon scribing a second diagonal line in the slot 9 or along the angular edge at the end of the rule according to which device was adopted in the first instance the two diagonal lines so obtained will be found to intersect at the centre of the surface.

I claim:

Improvements in gauges, consisting in a member having the form of a graduated rule, and a slotted head member wherein said rule is slidable at right angles thereto, said rule member being flexible to allow of the rule being held temporarily in fixed relation to the head member on pressure being applied to the respective members by the fingers.

WARREN FREDERICK FLESSELLES.